US012267284B2

(12) United States Patent
S

(10) Patent No.: US 12,267,284 B2
(45) Date of Patent: Apr. 1, 2025

(54) MESSAGE BROKER CONSUMER GROUP VERSIONING

(71) Applicant: SAP SE, Walldorf (DE)

(72) Inventor: Anbusivam S, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/880,075

(22) Filed: Aug. 3, 2022

(65) Prior Publication Data

US 2024/0048512 A1 Feb. 8, 2024

(51) Int. Cl.
H04L 51/06 (2022.01)
G06F 8/71 (2018.01)

(52) U.S. Cl.
CPC ............. H04L 51/06 (2013.01); G06F 8/71 (2013.01)

(58) Field of Classification Search
CPC ....... G06F 8/71; G06F 8/658; H04L 41/0873; H04L 63/104; H04L 65/1093; H04L 12/1859
See application file for complete search history.

(56) References Cited

U.S. PATENT DOCUMENTS

| | | | |
|---|---|---|---|
| 7,779,406 B2 | 8/2010 | Blanding et al. | |
| 9,256,424 B1* | 2/2016 | Kuchibhotla | ............ G06F 8/71 |
| 9,807,143 B2* | 10/2017 | Braudes | ............ H04L 67/02 |
| 11,029,940 B2* | 6/2021 | Peschansky | ............ H04L 67/02 |
| 11,050,848 B2* | 6/2021 | Nucci | ............ H04L 63/062 |
| 11,074,066 B2* | 7/2021 | Shin | ............ G06F 8/65 |
| 11,206,185 B2 | 12/2021 | Sarood et al. | |
| 11,496,577 B2* | 11/2022 | Acharya | ............ H04L 45/74 |

(Continued)

FOREIGN PATENT DOCUMENTS

| | | |
|---|---|---|
| CN | 106375200 A | 2/2017 |
| CN | 109788026 A | 5/2019 |

(Continued)

OTHER PUBLICATIONS

"KIP-584: Versioning scheme for features", Kowshik, [Online]. Retrieved from the Internet: <URL: https://cwiki.apache.org/confluence/display/KAFKA/KIP-584%3A+Versioning+scheme+for+features>, (Oct. 30, 2020), 17 pgs.

(Continued)

Primary Examiner — Alex H. Tran
(74) Attorney, Agent, or Firm — SCHWEGMAN LUDBERG & WOESSNER, P.A.

(57) ABSTRACT

In an example embodiment a mechanism for consumer group versioning is introduced. Here, each application runtime provides a version for any consumer group during its deployment and keeps increasing the version whenever there is an enhancement or bug fix. Thus, both the application and the consumer group will have a version. Once it is recognized that a consumer group assigned to partitions in a topic has an outdated consumer group version number (i.e., a consumer group with the same name/application but a later consumer group version number has been registered with the message broker), the old consumer group is disconnected immediately. This allows the message broker to immediately assign partitions to the consumers in the newer consumer group, thus avoiding the aforementioned delays and associated technical problems.

20 Claims, 6 Drawing Sheets

(56) References Cited

U.S. PATENT DOCUMENTS

| | | | |
|---|---|---|---|
| 11,650,813 B2* | 5/2023 | Moondhra | G06F 16/9027 717/121 |
| 2008/0244613 A1 | 10/2008 | Parthasarathy et al. | |
| 2016/0026699 A1* | 1/2016 | Tian | G06F 16/2308 707/623 |
| 2019/0227781 A1 | 7/2019 | Ramasamy et al. | |
| 2019/0362015 A1 | 11/2019 | Sankar et al. | |
| 2020/0153888 A1 | 5/2020 | Lazu | |
| 2022/0021652 A1 | 1/2022 | Moghe et al. | |
| 2022/0078248 A1 | 3/2022 | Upton et al. | |
| 2023/0140409 A1* | 5/2023 | Kaitha | G06F 9/542 717/169 |
| 2023/0142108 A1 | 5/2023 | Iyer et al. | |
| 2024/0048610 A1 | 2/2024 | S | |

FOREIGN PATENT DOCUMENTS

| | | |
|---|---|---|
| CN | 113031986 A | 6/2021 |
| CN | 113918364 A | 1/2022 |

OTHER PUBLICATIONS

"Managing Apache Kafka", Cloudera Runtime, [Online]. Retrieved from the Internet: <URL: https://docs.cloudera.com/runtime/7.2.1/kafka-managing/kafka-managing.pdf>, (Dec. 18, 2019), 30 pgs.

"Multi-Tenant Apache Kafka for Hops", Misganu Dessalegn Muruts, [Online]. Retrieved from the Internet: <URL: http://kth.diva-portal.org/smash/get/diva2:1091136/FULLTEXT01.pdf>, (Nov. 15, 2016), 70 pgs.

Canas, Cesar, et al., "Self-Evolving Subscriptions for Content-Based Publish/Subscribe Systems", IEEE 37th International Conference on Distributed Computing Systems, [Online]. Retrieved from the Internet: <URL: http://msrg.org/publications/pdf_files/2017/evosubs-icdcs17-Self-Evolving_Subscriptions_f.pdf>, (2017), 11 pgs.

Goldstein, Jonathan, et al., "A.M.B.R.O.S.I.A: Providing Performant Virtual Resiliency for Distributed Applications", Proceedings of the VLDB Endowment, vol. 13, Issue 5, [Online]. Retrieved from the Internet: <URL: https://dl.acm.org/doi/pdf/10.14778/3377369.3377370>, (2019), 588-301.

Kra, Yonatan, "Handling Different Kafka Message Versions", [Online]. Retrieved from the Internet: <URL: https://yonatankra.com/handling-different-kafka-message-versions/ >, (Jun. 30, 2020), 3 pgs.

Narkhede, Neha, et al., "Kafka Consumers: Reading Data from Kafka", [Online]. Retrieved from the Internet: < URL: https://www.oreilly.com/library/view/kafka-the-definitive/9781491936153/ch04.html>, (Accessed Jul. 27, 2022), 42 pgs.

Rooney, Sean, et al., "Kafka: the Database Inverted, but Not Garbled or Compromised", IEEE International Conference on Big Data (Big Data), [Online]. Retrieved from the Internet: <URL: https://ieeexplore.ieee.org/stamp/stamp.jsp?tp=&arnumber=9005583>, (2019), 3874-3880.

"U.S. Appl. No. 17/880,034, Examiner Interview Summary mailed Apr. 29, 2024", 2 pgs.

"U.S. Appl. No. 17/880,034, Non Final Office Action mailed Mar. 26, 2024", 12 pgs.

"U.S. Appl. No. 17/880,034, Response filed May 16, 2024 to Non Final Office Action mailed Mar. 26, 2024", 11 pgs.

U.S. Appl. No. 17/880,034, filed Aug. 3, 2022, Disconnection of Message Broker Consumer Groups of Prior Application Versions.

"U.S. Appl. No. 17/880,034, Final Office Action mailed Sep. 5, 2024", 12 pgs.

"U.S. Appl. No. 17/880,034, Examiner Interview Summary mailed Oct. 25, 2024", 2 pgs.

* cited by examiner

MESSAGE BROKER CONSUMER GROUP VERSIONING

TECHNICAL FIELD

This document generally relates to message brokers. More specifically, this document relates to message broker consumer group versioning.

BACKGROUND

A message broker is software that enables applications, systems, and services to communicate with each other and exchange information. Message brokers can be used for asynchronous communication using a publish/subscribe model. In this message distribution pattern, the source of each message publishes the message to a topic at the message broker, and multiple message consumers subscribe to topics from which they want to receive messages. All messages published to a topic are distributed to all the applications subscribed to it.

Microservices are small, independent software processes that can be written in multiple languages. An infrastructure designed for these modular components is known as a microservices environment or microservices architecture. Cloud environments may be used to implement microservices environments. An example of a microservices environment is SAP Cloud Platform® Extension Manager, from SAP SE of Walldorf, Germany. Microservices can use a message broker for communications among themselves as well as to and from other applications.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
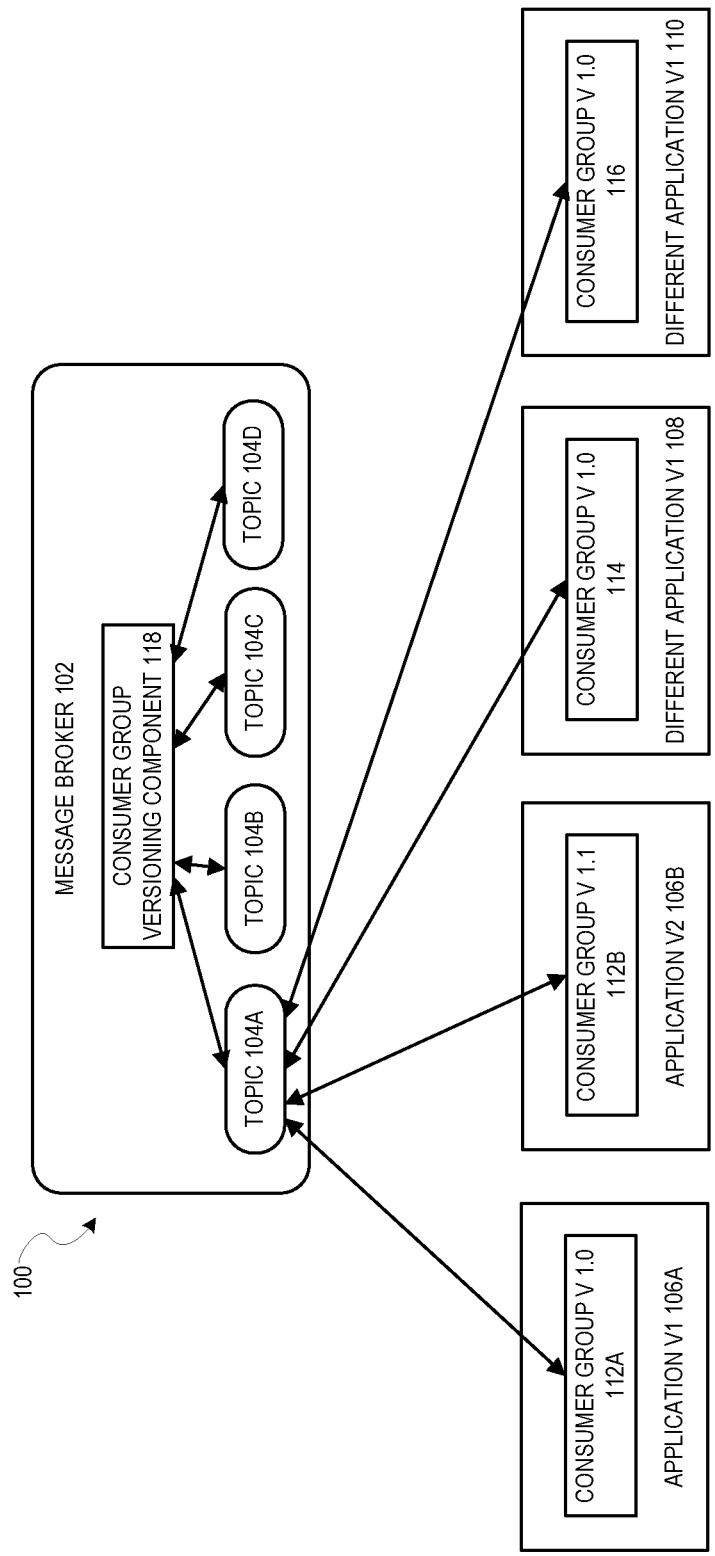
FIG. 1 is a block diagram illustrating a system for consumer group versioning, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One issue that arises with message brokers, and especially with microservices subscribed to topics in message brokers, is that an individual microservice (which is an application) may get overwhelmed with incoming messages that have been posted to a subscribed topic. This is especially true as a microservices architecture is scaled: as the number of microservices in an architecture increases, the number of messages sent in that architecture increases exponentially. The result is that an individual microservice that is subscribed to a topic may receive more messages than it is able to process during a given time period, causing delays in processing and/or the dropping of messages.

One solution is to use topic partitioning. Here, a message broker divides a topic into multiple partitions, with each partition only holding a subset of all the messages handled by the topic. The partitions are all essentially listed to the same topic, but each only takes one subsection of the messages posted to that topic. A group of message consumers (such as microservices), called a consumer group, can then be established, each of which is assigned to a different partition (in some instances a consumer in the consumer group can be assigned to multiple partitions, but no partitions are assigned to more than one consumer in the same consumer group). (It is possible to have more than one consumer group for the same topic where each consumer group receives copy of all the messages from the topic.) Here, for example, an application that will consume messages can be divided up into multiple redundant microservices, and each of those redundant microservices may be added to a specific consumer group. Thus, each of the consuming microservices in the consumer group receives and processes only a subset of the messages for that topic. There can then be additional coordination among the consuming microservices in the consumer group to synchronize the results of their independent processing, such as by storing output data in a repository shared among the consuming microservice in the consumer group.

Another technical issue that arises, however, is that the applications themselves may be occasionally upgraded or otherwise modified, such as to add enhancements or bug fixes. In such a case, a new consumer is created part of the upgraded application for an existing consumer group. The problem is that there is then a delay in when the new consumer can begin to receive and process messages from the topic in the message broker. This is because the message broker has fully assigned all the partitions in the topic to one or more consumers (e.g., microservices) in the consumer group of the old version of the application, and thus the message broker will need to wait until each of those consumers in the consumer group in the old version of the application has disconnected before reassigning the partition(s) to the new consumers in the consumer group.

This delay can cause problems in the architecture. At the very least, whatever improvement or bug fix the new version of the application implements will not get to be fully utilized until the message broker starts assigning consumers in the consumer group associated with the new version to the partitions of the topic. It also leads to a situation where either the exact time the functioning of the old version of the application will be completely passed over to the functioning of the new version of the application microservices is unpredictable, or some preplanned disconnection of the consumers in the consumer group of the old version of the application needs to be scheduled.

In an example embodiment, this technical issue is overcome by introducing a mechanism for consumer group versioning. Here, each application runtime provides a version for any consumer group during its deployment and keeps increasing a version number whenever there is an enhancement or bug fix. Thus, both the application and the consumer group will have a version. Notably, there is no requirement that these version numbers match each other, just that each is incremented when a new version of the application is deployed. Thus, if an application is deployed with a version 1, a consumer group may be created with version 1.0. When the application is upgraded to a later version, say version 2, the newly created consumer for this new version may be assigned a label of version 1.1 for the existing consumer group (i.e., incremented from the previous version of the consumer group for this application). (Throughout this document should we name the consumer group as well as something like CG1 instead of simply saying Consumer Group? Because there can be more than one consumer group for a topic.)

Once it is recognized that a consumer group assigned to partitions in a topic has an outdated consumer group version number (i.e., a consumer group with the same name/application but a later consumer group version number has been registered with the message broker), the old consumer group version is disconnected immediately. This allows the message broker to immediately assign partitions to the consumers in the newer version of the consumer group, thus avoiding the aforementioned delays and associated technical problems. It should be noted that embodiments are possible where the disconnection of the old consumer group and subsequent assignment of the new consumer group may not be exactly immediate. Specifically, in some instances it may be desirable to allow existing message consumers in the old consumer group to complete processing of any messages already sent to them. In some message brokers, for example, it is common to not only serve messages to message consumers but also to wait for acknowledgement that those messages were received. In cases where no acknowledgement is received after a certain timeout period, the message may be resent. In order to allow enough time for these acknowledgements to occur, in an example embodiment the disconnection of the old consumer group waits until acknowledgements for all outstanding messages have been received, or the timeout period to pass, whichever is first.

The size of a consumer group for a topic may also be limited to the number of partitions for the topic. In other words, the number of message consumers in the consumer group may be restricted so as to never exceed the number of partitions for the topic. Any new assignment of a message consumer to a consumer group that is already full (already has a number of message consumers equal to the number of partitions for the topic) will need to wait until one of the existing message consumers in the consumer group goes idle.

There are several ways this mechanism for consumer group versioning can be implemented. In one example embodiment, the functionality for handling the consumer group versioning is implemented within the message broker itself. FIG. 1 is a block diagram illustrating a system 100 for consumer group versioning, in accordance with an example embodiment. Here, a message broker 102 may maintain a number of topics 104A-104D, with one or more of these topics 104A-104D being divided into multiple partitions (not pictured). One example of a message broker 102 is Kafka™ from the Apache Software Foundation of Wilmington, Delaware. Various applications 106A, 108, 110 subscribe to one or more of the topics. Here, applications 106A, 108, and 110 subscribe to topic 104A. Each of these applications 106A, 108, 110 may have an associated consumer group 112A, 114, 116 with a consumer group version number.

When a new version of application 106A is deployed, which is depicted as application 106B, it is assigned a new application version number (incremented from the version number associated with application 106A), but also its associated consumer group 112B is assigned a consumer group version number (incremented from the version number associated with consumer group 112A). It should be noted that while consumer group 112A and 112B are given different reference numerals in the figure, they will actually share the same consumer group name. The only difference will be in their respective consumer group version numbers. It should also be noted that each application 106A, 106B, 108, 110 depicted here may, in fact, be an instance of an application, depending upon the nomenclature used. Thus, for example, application 106B may be considered to be an application instance of the same application (albeit a different version of the application) as the application instance depicted as application 106A.

The assignment of the new application number to the application upon creation and deployment of an upgrade or patch and the assignment of the new consumer group version number (with the same consumer group name the application was originally intended to use) may be performed, for example, by an application developer. Embodiments are possible, however, where the assignment of the consumer group version number is performed by an entity or component other than the application developer.

When a connection request is received at message broker 102 at topic 104A from any application, such as application 106B, for any consumer group, such as 112A with a version such as v 1.1, a consumer group versioning component 118 within the message broker 102 determines whether the consumer group version number for the application is greater than the last known consumer group version number for the given consumer group such as 112B. Thus, in this case, the consumer group versioning component 118 would determine whether the consumer group version number for consumer group 112B is greater than the last known consumer group version number (the last version of the application being application 106A, with a consumer group version number associated with consumer group 112A with consumer group version v1.0). When the consumer group versioning component 118 determines that the consumer group version number for the consumer group 112B for the application issuing the connection request is greater than the last known consumer group version number for that same consumer group (such as is the case here), it will then immediately terminate the consumers having the last known consumer group version number for that same consumer group and assign partitions of the topic (e.g., topic 104A) to one or more consumers in the consumer group of the application insuring the connection request (here, consumer group 112B). This assignment process may be based on some partitioning logic already created for the message broker 102.

There are a number of different ways to implement partitioning logic. One example is rangeassignor, which aims to co-localize partitions of several topics by putting all consumers in lexicographic order of member identification and then putting available topic partitions in numeric order. The first partition in the list in each topic is then assigned to the first consumer in the list. Another example is round robin, which distributes available partitions evenly across all consumers. Another example is a sticky assignor, which is similar to round robin except it attempts to minimize partition movements between two assignments, all while ensuring a uniform distribution. Another example is streams partition assignor, which is used to assign partitions across application instances while ensuring their co-location and maintaining states for active and standby tasks.

Then subsequent messages posted to the topic 104A will be distributed to the one or more consumers in consumer group 112B V1.1 instead of the one or more consumers in consumer group 112A V1.0.

Figure 2:
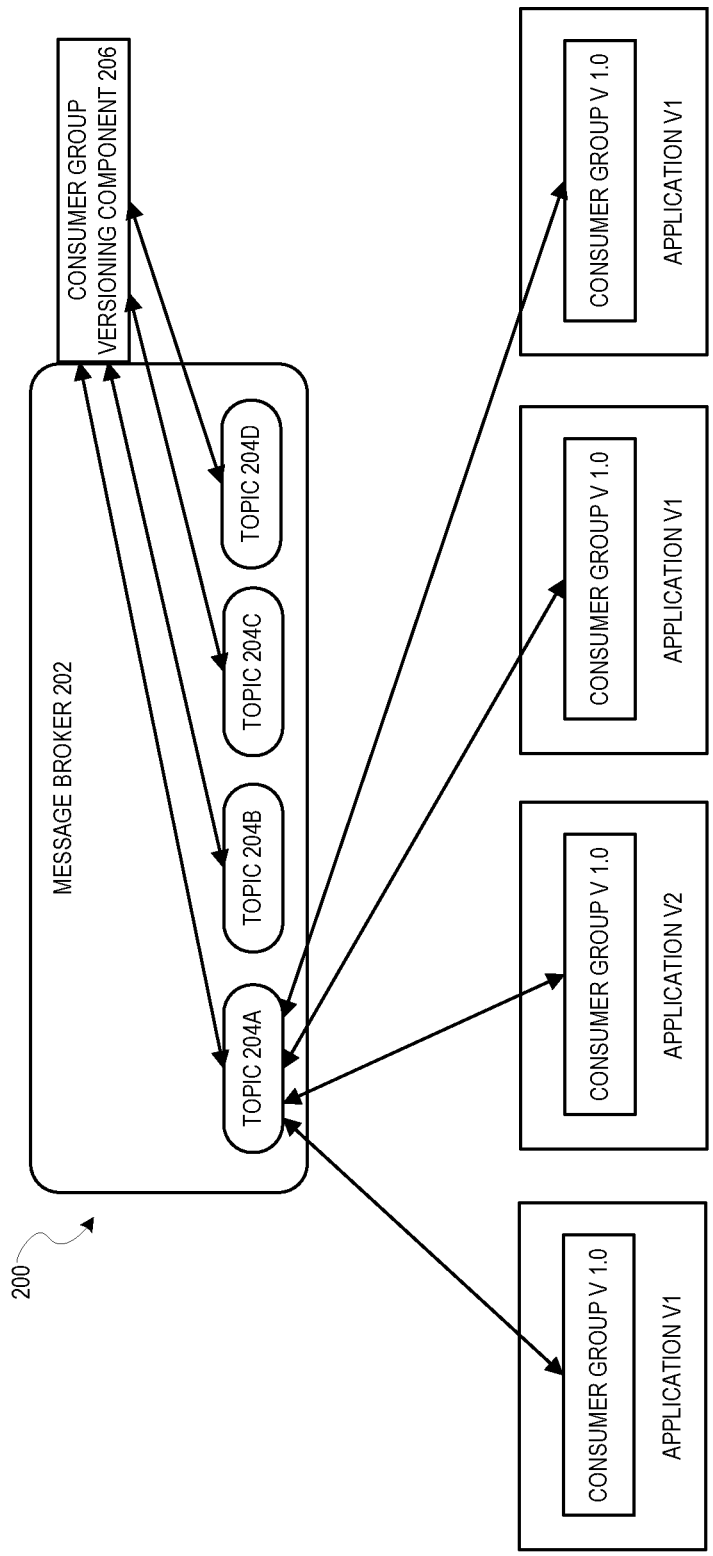
FIG. 2 is a block diagram illustrating a system for consumer group versioning, in accordance with an example embodiment.

In another example embodiment, the functionality for handling the consumer group versioning is implemented as an extension to the message broker. FIG. 2 is a block diagram illustrating a system 200 for consumer group versioning, in accordance with an example embodiment. Here, as in FIG. 1, a message broker 202 may maintain a number of topics 204A-204D, with one or more of these topics 204A-204D being divided into multiple partitions (not pictured). The functionality of FIG. 1 is the same, except rather than having the consumer group versioning component 206 within the message broker 202, it is a separate extension to the message broker 202.

In another example embodiment, the functionality for handling the consumer group versioning is implemented as a completely separate component from the message broker, intercepting messages to the message broker and sending its own messages instructing the message broker what to do.

Figure 3:
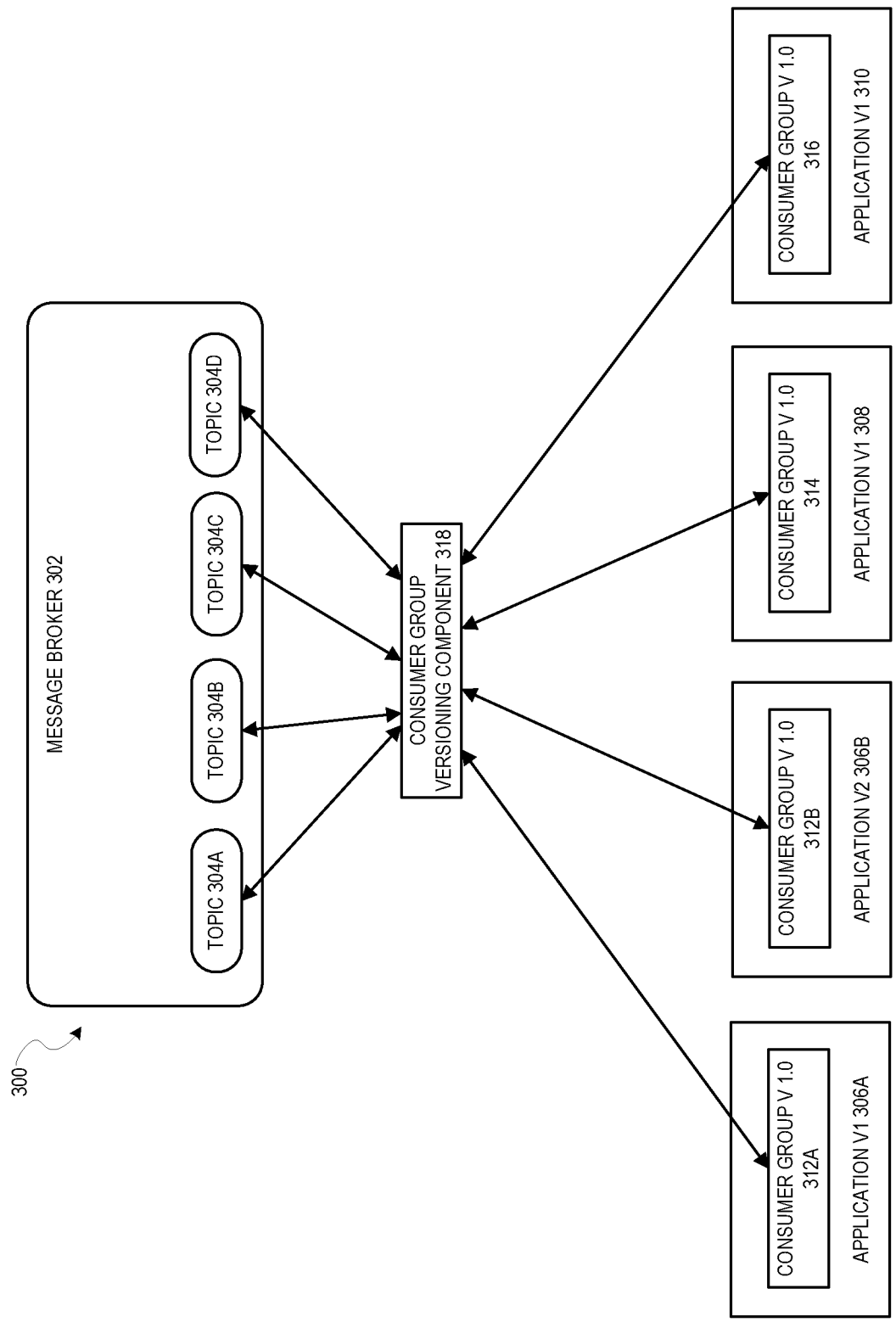
FIG. 3 is a block diagram illustrating a system for consumer group versioning, in accordance with an example embodiment.

FIG. 3 is a block diagram illustrating a system 300 for consumer group versioning, in accordance with an example embodiment. Here, a message broker 302 may maintain a number of topics 304A-304D, with one or more of these topics 304A-304D being divided into multiple partitions (not pictured). As in FIG. 1, various applications 306A, 306B, 308, 310 subscribe to one or more of the topics. Here, applications 306A, 306B, 308, and 310 subscribe to topic 304A. Each of these applications 306A, 306B, 308, 310 may have an associated consumer group 312A, 306B, 314, 316 with a consumer group version number.

When a new version of application 306A is deployed, which is depicted as application 306B, it is assigned a new application version number (incremented from the version number associated with application 306A), but also its associated consumer group 312B is assigned a consumer group version number (incremented from the version number associated with consumer group 312A).

When a connection request is sent from any application to the message broker 302, such as from application 306B, a consumer group versioning component 318 intercepts the connection request. It then determines whether the consumer group version number for the consumer group is greater than the last known consumer group version number for the consumer group. Thus, in this case, the consumer group versioning component 318 would determine whether the consumer group version number for consumer group is greater than the last known consumer group version number for that same consumer group (the last version of the application being application 306A, with a consumer group version number V1.0 associated with consumer group 312A). When the consumer group versioning component 318 determines that the consumer group version number for the consumer group for the application issuing the connection request is greater than the last known consumer group version number for that same consumer group (such as is the case here), it will then send a command to the message broker 302 to immediately terminate the consumer group having the last known consumer group version number for that same consumer group and assign partitions of the topic (e.g., topic 304A) to one or more consumers in the consumer group of the application insuring the connection request (here, consumer group 312B. Otherwise, the consumer group versioning component 318 just passes the connection request as-is to the message broker 302.

Figure 4:
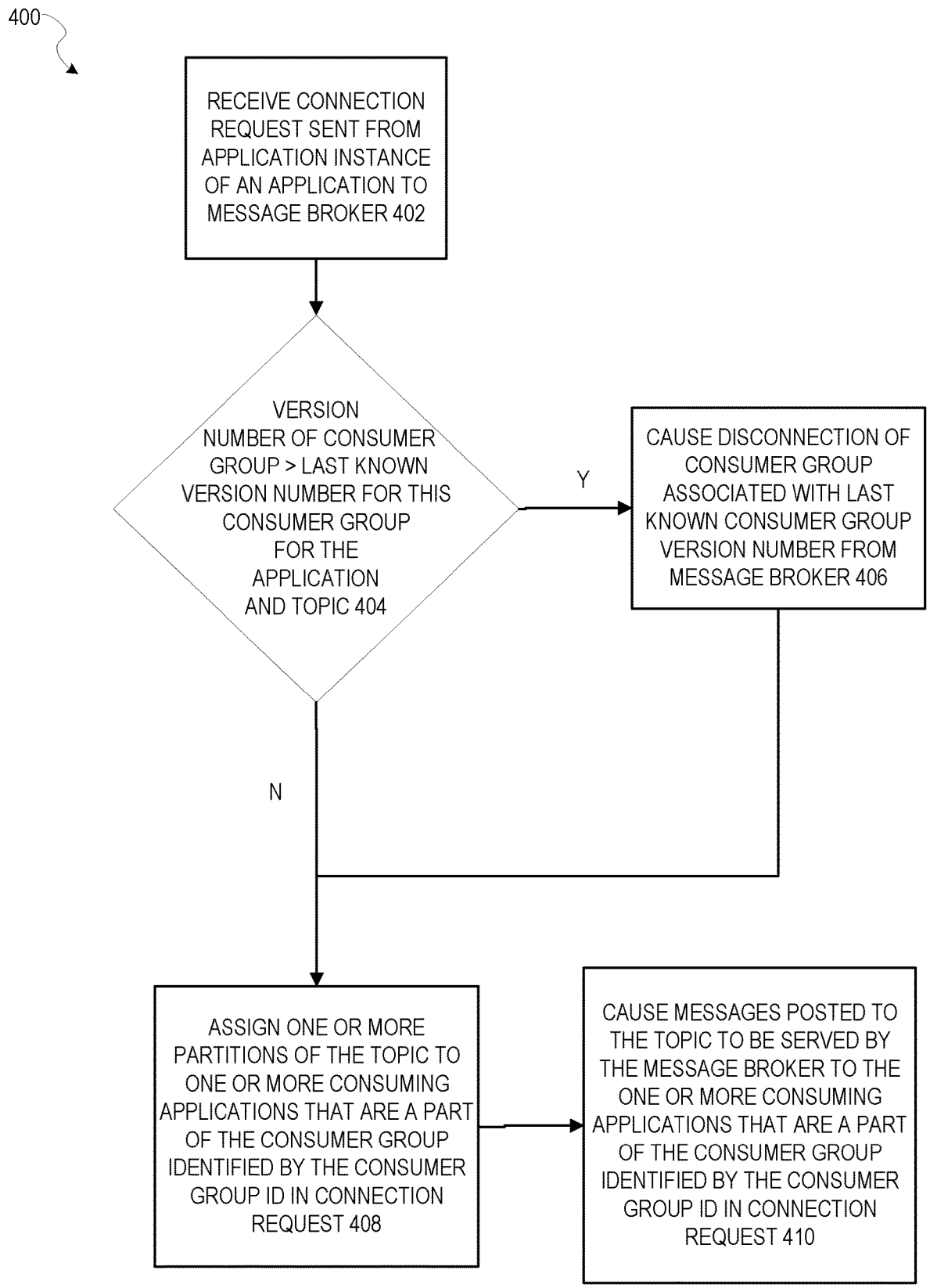
FIG. 4 is a flow diagram illustrating a method of consumer group versioning in accordance with an example embodiment.

FIG. 4 is a flow diagram illustrating a method 400 of consumer group versioning in accordance with an example embodiment. The method 400 may be performed by any of the consumer group versioning components 118, 206, 318 of FIGS. 1-3. At operation 402, a connection request sent from an application instance of an application to a message broker is received. This connection request includes, for a topic of the message broker, a consumer group identification and a consumer group version number. At operation 404, it is determined whether the consumer group version number is greater than a last known consumer group version number associated with the consumer group name and topic. If so, then at operation 406, a consumer group associated with the last known consumer group version number is caused to disconnect from the message broker. In cases where the method 400 is performed by the message broker itself or by a component that is an extension of the message broker, operation 406 may be performed by directly disconnecting the consumers associated with the last known consumer group version number. In cases where the method 400 is performed by a component that is separate from the message broker, operation 406 may be performed by sending a command to the message broker to perform the disconnection.

At operation 408, if it is determined that the consumer group version number is not greater than a last known consumer group version number associated with the consumer group and topic, one or more partitions of the topic are assigned to one or more consuming applications that are a part of the consumer group identified by the consumer group identification of the connection request. In an example embodiment, these applications are microservices. This assignment may be made as part of a partitioning scheme of the message broker, such as rangeassignor, round robin, sticky assignor, and streams partition assignor.

At operation 410, messages posted to the topic are then served by the message broker to the one or more consuming applications that are a part of the consumer group identified by the consumer group identification of the connection request.

In view of the disclosure above, various examples are set forth below. It should be noted that one or more features of an example, taken in isolation or combination, should be considered within the disclosure of this application.

Example 1. A system comprising:
    at least one hardware processor; and
    a computer-readable medium storing instructions that, when executed by the at least one hardware processor, cause the at least one hardware processor to perform operations comprising:
        receiving a connection request sent from an application instance of an application to a message broker, the connection request including, for a topic of the message broker, a consumer group identification and a consumer group version number;
        determining whether the consumer group version number is greater than a last known consumer group version number for the consumer group;

in response to a determination that the consumer group version number is greater than a last known consumer group version number for the consumer group, causing the message broker to disconnect one or more message consumers in a consumer group associated with the last known consumer group version number; and causing assignment of one or more message consumers in a consumer group associated with the consumer group identification to one or more partitions of the topic, each partition responsible for serving a different subset of messages posted to the topic, each partition only assigned to a single message consumer at a time, such that messages posted to the topic are served by the message broker to one or more of the one or more message consumers associated with the consumer group identification.

Example 2. The system of Example 1, wherein the receiving, determining, causing the message broker to disconnect, and the causing assignment are performed by the message broker.

Example 3. The system of Examples 1 or 2, wherein the receiving, determining, causing the message broker to disconnect, and the causing assignment are performed by an extension of the message broker.

Example 4. The system of any of Examples 1-3, wherein the receiving, determining, causing the message broker to disconnect, and the causing assignment are performed by a component separate and distinct from the message broker.

Example 5. The system of Example 4, wherein the causing the message broker to disconnect includes sending a command to the message broker to perform the disconnecting.

Example 6. The system of any of Examples 1-5, wherein the application instance is a microservice.

Example 7. The system of any of Examples 1-6, wherein the causing assignment includes using a partitioning scheme.

Example 8. A method comprising:
receiving a connection request sent from an application instance of an application to a message broker, the connection request including, for a topic of the message broker, a consumer group identification and a consumer group version number;

determining whether the consumer group version number is greater than a last known consumer group version number for the consumer group;

in response to a determination that the consumer group version number is greater than a last known consumer group version number for the consumer group, causing the message broker to disconnect one or more message consumers in a consumer group associated with the last known consumer group version number; and causing assignment of one or more message consumers in a consumer group associated with the consumer group identification to one or more partitions of the topic, each partition responsible for serving a different subset of messages posted to the topic, each partition only assigned to a single message consumer at a time, such that messages posted to the topic are served by the message broker to one or more of the one or more message consumers associated with the consumer group identification.

Example 9. The method of Example 8, wherein the receiving, determining, causing the message broker to disconnect, and the causing assignment are performed by the message broker.

Example 10. The method of Examples 8 or 9, wherein the receiving, determining, causing the message broker to disconnect, and the causing assignment are performed by an extension of the message broker.

Example 11. The method of any of Examples 8-10, wherein the receiving, determining, causing the message broker to disconnect, and the causing assignment are performed by a component separate and distinct from the message broker.

Example 12. The method of Example 11, wherein the causing the message broker to disconnect includes sending a command to the message broker to perform the disconnecting.

Example 13. The method of any of Examples 8-12, wherein the application instance is a microservice.

Example 14. The method of any of Examples 8-13, wherein the causing assignment includes using a partitioning scheme.

Example 15. A non-transitory machine-readable medium storing instructions which, when executed by one or more processors, cause the one or more processors to perform operations comprising:
receiving a connection request sent from an application instance of an application to a message broker, the connection request including, for a topic of the message broker, a consumer group identification and a consumer group version number;

determining whether the consumer group version number is greater than a last known consumer group version number for the consumer group;

in response to a determination that the consumer group version number is greater than a last known consumer group version number for the consumer group, causing the message broker to disconnect one or more message consumers in a consumer group associated with the last known consumer group version number; and causing assignment of one or more message consumers in a consumer group associated with the consumer group identification to one or more partitions of the topic, each partition responsible for serving a different subset of messages posted to the topic, each partition only assigned to a single message consumer at a time, such that messages posted to the topic are served by the message broker to one or more of the one or more message consumers associated with the consumer group identification.

Example 16. The non-transitory machine-readable medium of Example 15, wherein the receiving, determining, causing the message broker to disconnect, and the causing assignment are performed by the message broker.

Example 17. The non-transitory machine-readable medium of Examples 15 or 16, wherein the receiving, determining, causing the message broker to disconnect, and the causing assignment are performed by an extension of the message broker.

Example 18. The non-transitory machine-readable medium of any of Examples 15-17, wherein the receiving, determining, causing the message broker to disconnect, and the causing assignment are performed by a component separate and distinct from the message broker.

Example 19. The non-transitory machine-readable medium of Example 18, wherein the causing the message broker to disconnect includes sending a command to the message broker to perform the disconnecting.

Example 20. The non-transitory machine-readable medium of any of Examples 15-19, wherein the application instance is a microservice.

Figure 5:
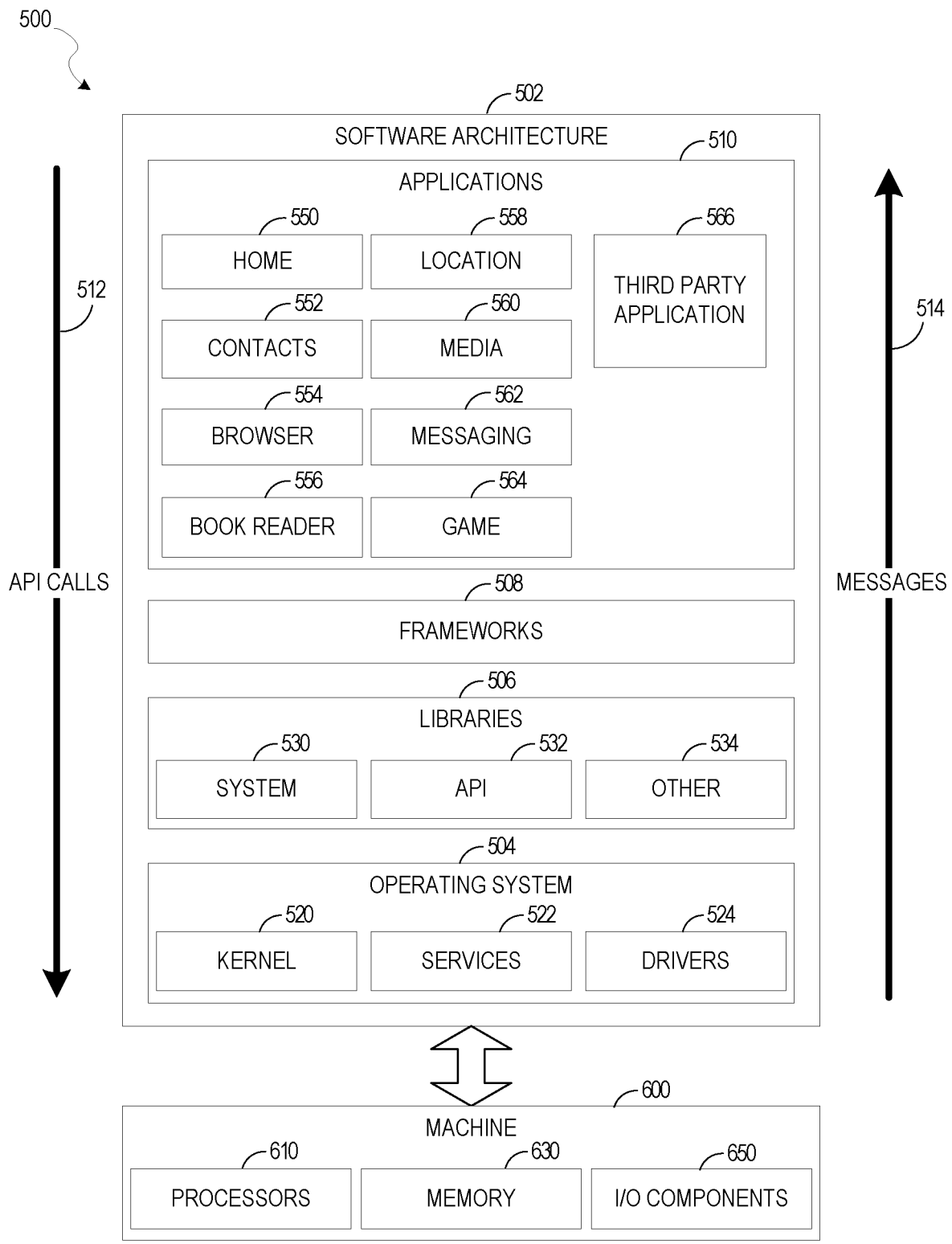
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
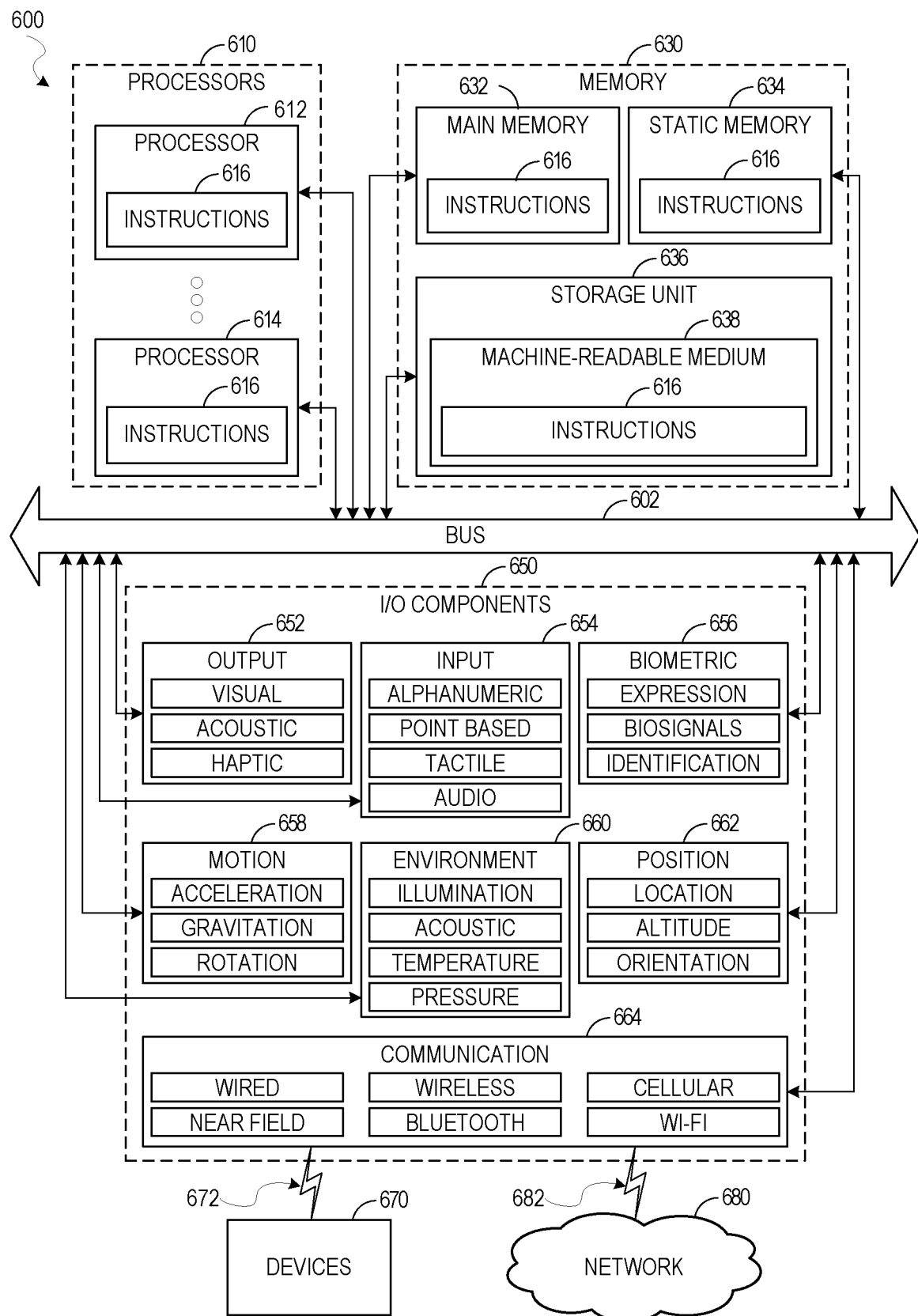
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving a connection request sent from a first application instance of an application to a message broker, the connection request including, for a topic of the message broker, a consumer group identification and a consumer group version number, the consumer group identification identifying a group of message consumers and the consumer group version number indicating a version of the group of message consumers, the consumer group version number being different than a version number assigned to an application to which the group of message consumers is associated, each message consumer of the group of message consumers being microservices;
   determining whether the consumer group version number is greater than a last known consumer group version number for the consumer group;
   in response to a determination that the consumer group version number is greater than the last known consumer group version number for the consumer group, causing the message broker to disconnect one or more message consumers, including a second application instance of the application, having an older consumer group version number than the consumer group version number of the first application instance; and
   causing assignment of one or more message consumers in a consumer group associated with the consumer group identification to one or more partitions of the topic, each partition responsible for serving a different subset of messages posted to the topic, each partition only assigned to a single message consumer at a time, such that messages posted to the topic are served by the message broker to one or more of the one or more message consumers associated with the consumer group identification.

2. The system of claim 1, wherein the receiving, determining, causing the message broker to disconnect, and the causing assignment are performed by the message broker.

3. The system of claim 1, wherein the receiving, determining, causing the message broker to disconnect, and the causing assignment are performed by an extension of the message broker.

4. The system of claim 1, wherein the receiving, determining, causing the message broker to disconnect, and the causing assignment are performed by a component separate and distinct from the message broker.

5. The system of claim 4, wherein the causing the message broker to disconnect includes sending a command to the message broker to perform the disconnecting.

6. The system of claim 1, wherein the first application instance is a microservice.

7. The system of claim 1, wherein the causing assignment includes using a partitioning scheme.

8. A method comprising:
receiving a connection request sent from a first application instance of an application to a message broker, the connection request including, for a topic of the message broker, a consumer group identification and a consumer group version number, the consumer group identification identifying a group of message consumers and the consumer group version number indicating a version of the group of message consumers, the consumer group version number being different than a version number assigned to an application to which the group of message consumers is associated, each message consumer of the group of message consumers being microservices;
determining whether the consumer group version number is greater than a last known consumer group version number for the consumer group;
in response to a determination that the consumer group version number is greater than the last known consumer group version number for the consumer group, causing the message broker to disconnect one or more message consumers, including a second application instance of the application, having an older consumer group version number than the consumer group version number of the first application instance; and
causing assignment of one or more message consumers in a consumer group associated with the consumer group identification to one or more partitions of the topic, each partition responsible for serving a different subset of messages posted to the topic, each partition only assigned to a single message consumer at a time, such that messages posted to the topic are served by the message broker to one or more of the one or more message consumers associated with the consumer group identification.

9. The method of claim 8, wherein the receiving, determining, causing the message broker to disconnect, and the causing assignment are performed by the message broker.

10. The method of claim 8, wherein the receiving, determining, causing the message broker to disconnect, and the causing assignment are performed by an extension of the message broker.

11. The method of claim 8, wherein the receiving, determining, causing the message broker to disconnect, and the causing assignment are performed by a component separate and distinct from the message broker.

12. The method of claim 11, wherein the causing the message broker to disconnect includes sending a command to the message broker to perform the disconnecting.

13. The method of claim 8, wherein the first application instance is a microservice.

14. The method of claim 8, wherein the causing assignment includes using a partitioning scheme.

15. A non-transitory machine-readable medium storing instructions which, when executed by one or more processors, cause the one or more processors to perform operations comprising:
receiving a connection request sent from a first application instance of an application to a message broker, the connection request including, for a topic of the message broker, a consumer group identification and a consumer group version number, the consumer group identification identifying a group of message consumers and the consumer group version number indicating a version of the group of message consumers, the consumer group version number being different than a version number assigned to an application to which the group of message consumers is associated, each message consumer of the group of message consumers being microservices;
determining whether the consumer group version number is greater than a last known consumer group version number for the consumer group;
in response to a determination that the consumer group version number is greater than the last known consumer group version number for the consumer group, causing the message broker to disconnect one or more message consumers, including a second application instance of the application, having an older consumer group version number than the consumer group version number of the first application instance; and
causing assignment of one or more message consumers in a consumer group associated with the consumer group identification to one or more partitions of the topic, each partition responsible for serving a different subset of messages posted to the topic, each partition only assigned to a single message consumer at a time, such that messages posted to the topic are served by the message broker to one or more of the one or more message consumers associated with the consumer group identification.

16. The non-transitory machine-readable medium of claim 15, wherein the receiving, determining, causing the message broker to disconnect, and the causing assignment are performed by the message broker.

17. The non-transitory machine-readable medium of claim 15, wherein the receiving, determining, causing the message broker to disconnect, and the causing assignment are performed by an extension of the message broker.

18. The non-transitory machine-readable medium of claim 15, wherein the receiving, determining, causing the message broker to disconnect, and the causing assignment are performed by a component separate and distinct from the message broker.

19. The non-transitory machine-readable medium of claim 18, wherein the causing the message broker to disconnect includes sending a command to the message broker to perform the disconnecting.

20. The non-transitory machine-readable medium of claim 15, wherein the first application instance is a microservice.

* * * * *